(12) United States Patent  (10) Patent No.: US 12,122,377 B2
Iwasaki et al.  (45) Date of Patent: Oct. 22, 2024

(54) TRAVELING CONTROL APPARATUS (71) Applicant: Honda Motor Co., Ltd., Tokyo (JP)

(72) Inventors: Shun Iwasaki, Wako (JP); Nana Niibo, Wako (JP); Shota Ishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 208 days.

(21) Appl. No.: 18/078,277

(22) Filed: Dec. 9, 2022

(65) Prior Publication Data
US 2023/0182733 A1    Jun. 15, 2023

(30) Foreign Application Priority Data

Dec. 15, 2021 (JP) .................. 2021-203420

(51) Int. Cl.
*B60W 30/16* (2020.01)
*B60W 30/02* (2012.01)
*B60W 30/14* (2006.01)
*B60W 40/105* (2012.01)
*G06V 20/56* (2022.01)
*G06V 20/58* (2022.01)

(52) U.S. Cl.
CPC .......... *B60W 30/16* (2013.01); *B60W 30/025* (2013.01); *B60W 30/143* (2013.01); *B60W 40/105* (2013.01); *G06V 20/58* (2022.01); *G06V 20/588* (2022.01); *B60W 2420/403* (2013.01); *B60W 2520/06* (2013.01); *B60W 2552/53* (2020.02); *B60W 2554/4041* (2020.02); *B60W 2554/4044* (2020.02); *B60W 2554/80* (2020.02)

(58) Field of Classification Search
CPC .. B60W 30/16; B60W 30/025; B60W 30/143; B60W 40/105; B60W 2420/403; B60W 2520/06; B60W 2552/53; B60W 2554/4041; B60W 2554/4044; B60W 2554/80; B60W 10/04; B60W 10/20; B60W 2552/00; B60W 2554/4042; B60W 2554/801; B60W 2554/802; B60W 2754/30; B60W 60/001; B60W 30/18; B60W 2520/10; B60W 2554/40; G06V 20/58; G06V 20/588
See application file for complete search history.

(56) References Cited

U.S. PATENT DOCUMENTS

2022/0229446 A1* 7/2022 Switkes .............. B60W 30/165

FOREIGN PATENT DOCUMENTS

JP       2005524135 A      8/2005

* cited by examiner

*Primary Examiner* — Yuen Wong
(74) *Attorney, Agent, or Firm* — Duft & Bornsen, PC

(57) ABSTRACT

A traveling control apparatus includes a microprocessor configured to perform: determining whether a second other vehicle is located within a predetermined range from a subject vehicle when the subject vehicle and a first other vehicle are closer than a predetermined degree in a traveling direction, when the first other vehicle traveling in a first adjacent lane adjacent to a current lane, which has a same traveling direction as the current lane, and the second other vehicle traveling in a second adjacent lane adjacent to the current lane are recognized; and when it is determined in the determining that the second other vehicle is located within the predetermined range, controlling a actuator so that a distance in the traveling direction from the subject vehicle to the first other vehicle becomes not less than a predetermined distance.

14 Claims, 6 Drawing Sheets

TRAVELING CONTROL APPARATUS

CROSS-REFERENCE TO RELATED APPLICATION

This application is based upon and claims the benefit of priority from Japanese Patent Application No. 2021-203420 filed on Dec. 15, 2021, the content of which are incorporated herein by reference.

BACKGROUND OF THE INVENTION

Field of the Invention

This invention relates to a traveling control system for controlling a traveling of a vehicle according to surrounding situation.

Description of the Related Art

As an apparatus of this type, an apparatus is known that measures the position of an adjacent vehicle traveling in an adjacent lane adjacent to a lane on which a subject vehicle travels and changes a position of the subject vehicle in a lane width direction according to a measurement result (see, for example, JP 2005-524135 A). In the apparatus described in JP 2005-524135 A, the position of the subject vehicle in the lane width direction is changed by correcting the driving path in a direction away from the adjacent vehicle.

However, in a case where the driving path is simply corrected in the direction away from the adjacent vehicle, as in the apparatus described in JP 2005-524135 A, the presence of another vehicle in that direction causes the subject vehicle to move in the direction of the other vehicle, which may cause discomfort to the occupant.

SUMMARY OF THE INVENTION

An aspect of the present invention is a traveling control apparatus includes a microprocessor configured to perform: recognizing a surrounding situation of a subject vehicle; controlling a traveling actuator to execute offset control in which the subject vehicle travels away from another vehicle in a vehicle width direction when a distance in a traveling direction from the subject vehicle to the other vehicle traveling in a same direction as the subject vehicle in an adjacent lane adjacent to a current lane in which the subject vehicle is traveling becomes less than a predetermined distance; and when a first other vehicle traveling in a first adjacent lane adjacent to the current lane on one side of the current lane, which has a same traveling direction as the current lane, and a second other vehicle traveling in a second adjacent lane adjacent to the current lane on another side of the current lane are recognized in the recognizing, determining whether the second other vehicle is located within a predetermined range from the subject vehicle when the subject vehicle and the first other vehicle are closer than a predetermined degree in the traveling direction. The microprocessor is configured to perform the controlling including, when it is determined in the determining that the second other vehicle is located within the predetermined range from the subject vehicle when the subject vehicle and the first other vehicle are closer than the predetermined degree in the traveling direction, controlling the traveling actuator so that the distance in the traveling direction from the subject vehicle to the first other vehicle becomes not less than the predetermined distance.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

A description will be given below of an embodiment of the present invention with reference to FIGS. 1A to 7B. A traveling control device according to the embodiment of the present invention can be applied to a vehicle having a driving support function or a self-driving capability. An example in which the traveling control device is applied to a vehicle (self-driving vehicle) having a self-driving capability will be described below. A vehicle to which the traveling control device according to the present embodiment is applied may be referred to as a subject vehicle to be distinguished from other vehicles. The subject vehicle can travel not only in a self-drive mode in which a driving operation by a driver is unnecessary, but also in a manual drive mode by the driving operation by the driver.

Figure 1A:
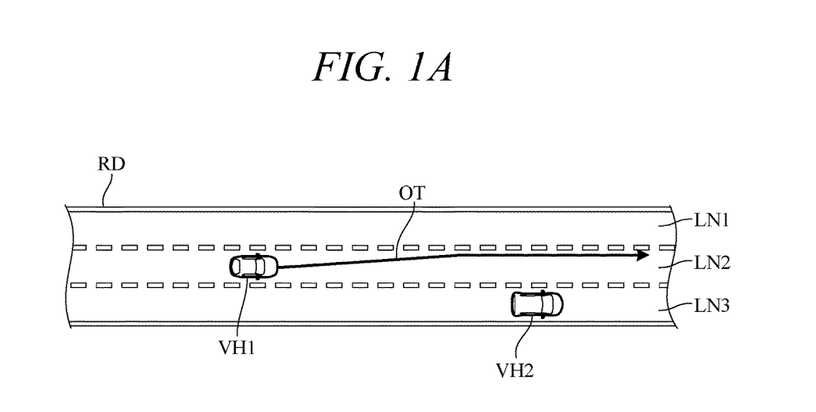
FIG. 1A is a diagram showing an example of a traveling scene of a vehicle.
Figure 1B:
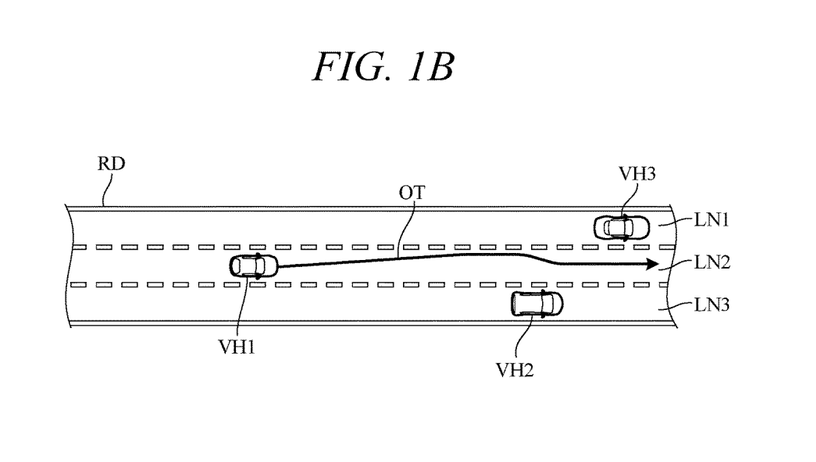
FIG. 1B is a diagram showing another example of a traveling scene of a vehicle.

FIGS. 1A and 1B illustrate an example of a traveling scene of a vehicle. FIG. 1A illustrates how a vehicle VH1, which is traveling at a vehicle speed V11 in the center lane LN2 of a left-hand side road RD with three lanes on each side, passes by the side of a vehicle VH2, which is traveling at a vehicle speed V12 (<V11) in the rightmost lane LN3. The vehicle VH1 is traveling in the self-drive mode, and the vehicle VH2 is traveling in the manual drive mode.

In FIG. 1A, when the vehicle VH1 traveling in the self-drive mode passes by the side of the vehicle VH2, the vehicle VH1 offsets its driving path to the left so that the distance in the vehicle width direction from the vehicle VH2 is at least a predetermined length, so as to reduce the feeling of pressure on the occupant due to the approach of the vehicle VH2. The arrow line OT schematically represents the driving path of the vehicle VH1.

On the other hand, when a vehicle VH3 is in the leftmost lane LN1 as illustrated in FIG. 1B, if the vehicle VH1 executes offset driving by correcting its driving path in the vehicle width direction when passing by the side of the vehicle VH2 as described above, the vehicles VH1 and VH3 will come closer together in the vehicle width direction, which may cause discomfort to the occupant. In addition, when the driving path of the vehicle VH1 is offset to the right in order to avoid approach to the vehicle VH3, the driving path of the vehicle VH1 becomes a path that causes the vehicle VH1 to wobble left and right as indicated by an arrow line OT in FIG. 1B, which may cause anxiety to the occupant. Thus, executing offset driving to avoid approach with the vehicle VH2 when the vehicle VH3 is present may cause discomfort or anxiety to the occupant. Therefore, in the present embodiment, the traveling control device is configured as follows.

Figure 2:
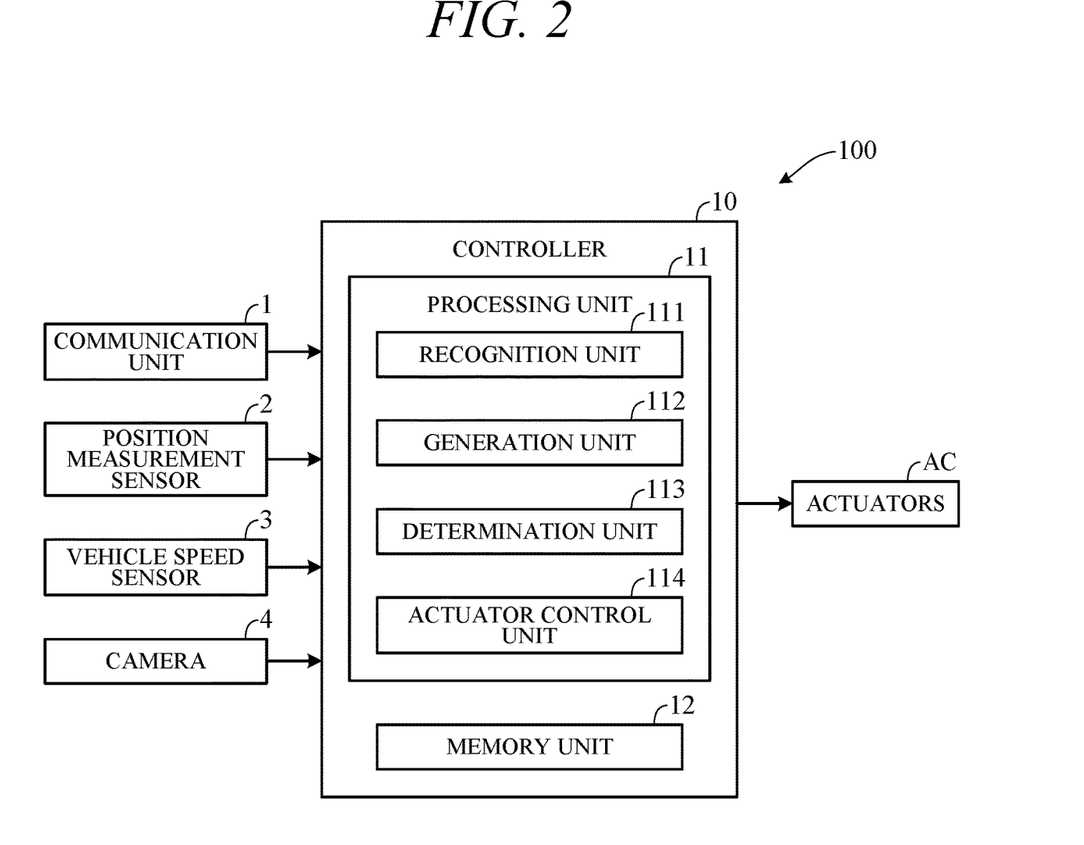
FIG. 2 is a block diagram schematically illustrating main configuration of a traveling control device according to an embodiment of the present invention.
Figure 3:
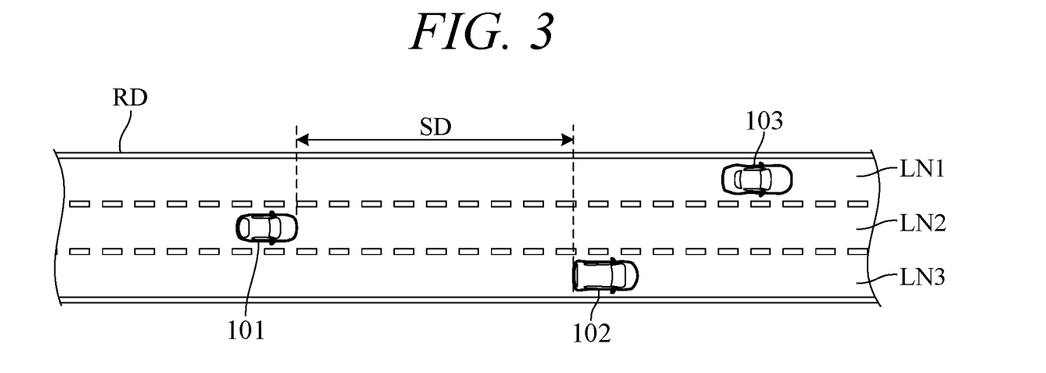
FIG. 3 is a diagram showing an example of a traveling scene of a vehicle to which the traveling control device of the present embodiment is applied.

FIG. 2 is a block diagram schematically illustrating the main configuration of a traveling control device 100. FIG. 3 illustrates an example of a traveling scene of a subject vehicle 101 to which the traveling control device 100 of the present embodiment is applied. Here, the respective components are described using the case where the subject vehicle 101 is traveling in the lane LN2 of the road RD in FIG. 3 as an example.

As illustrated in FIG. 2, the traveling control device 100 has a controller 10, a communication unit 1, a positioning sensor 2, a vehicle speed sensor 3, a camera 4, and traveling actuators (hereinafter simply referred to as the actuators) AC, which are each communicatively connected to the controller 10.

The communication unit 1 communicates with various devices (not illustrated) via a network including a wireless communication network represented by the Internet network, a mobile phone network, or the like, and acquires map information, traffic information, and the like periodically or at an arbitrary timing. The network includes not only public wireless communication networks, but also closed communication networks established for each given administrative region, such as wireless LAN, Wi-Fi (registered trademark), and Bluetooth (registered trademark).

The positioning sensor 2 receives a positioning signal transmitted from a positioning satellite. The positioning satellite is an artificial satellite such as a global positioning system (GPS) satellite or a quasi-zenith satellite. The positioning information received by the positioning sensor 2 is used to measure the current position (latitude, longitude, and altitude) of the subject vehicle 101. The positioning sensor 2 is used to detect the position of the subject vehicle 101. Therefore, a distance detection unit (for example, a radar or LiDAR) that detects the distance from the subject vehicle 101 to an object (object on the road) may be used instead of the positioning sensor 2. In this case, the position of the subject vehicle 101 is detected based on the position information of the object on the road obtained from the map information stored in a memory unit 12 and the information on distance to the object obtained by the positioning sensor 2. The positioning sensor 2 may be a combination of a receiver for positioning signals and a distance detection unit. The vehicle speed sensor 3 detects the vehicle speed of the subject vehicle 101.

The camera 4 includes an imaging device (image sensor) such as a CCD or a CMOS. The camera 4 may be a monocular camera or a stereo camera. The camera 4 captures images of the surroundings of the subject vehicle 101. The camera 4 is attached to, for example, at a predetermined position (front part or rear part) of the subject vehicle 101, and continuously captures images of the space around the subject vehicle 101 to acquire image data of the object (hereinafter referred to as captured image data or simply a captured image).

The actuators AC are traveling actuators for controlling traveling of the subject vehicle 101. In a case where the traveling drive source is an engine, the actuators AC includes a throttle actuator that adjusts an opening (throttle opening) of a throttle valve of the engine. In a case where the traveling drive source is a traveling motor, the traveling motor is included in the actuators AC. The actuators AC also includes a brake actuator that operates a braking device of the subject vehicle 101 and a steering actuator that drives a steering device.

The controller 10 includes an electronic control unit (ECU). More specifically, the controller 10 includes a computer including a processing unit 11 such as a CPU (microprocessor), a memory unit 12 such as a ROM and a RAM, and other peripheral circuits (not illustrated) such as an I/O interface. Although a plurality of ECUs having different functions such as an engine control ECU, a traveling motor control ECU, and a braking device ECU may be separately provided, in FIG. 2, the controller 10 is illustrated as a set of these ECUs for convenience.

The memory unit 12 stores highly accurate detailed map information (referred to as a high-precision map). The high-precision map information includes road position information, information of a road shape (curvature or the like), information of a road gradient, position information of an intersection or a branch point, information of the number of lanes, speed limit, width of a lane and position information for each lane (information of a center position of a lane or a boundary line of a lane position), position information of landmarks (traffic lights, buildings, etc.) as marks on a map, information on road signs (position, type, regulation information, etc.), and information of a road surface profile such as unevenness of a road surface. The memory unit 12 also stores information such as various control programs and thresholds used in the programs.

The processing unit 11 includes, as its functional configuration, a recognition unit 111, a generation unit 112, a determination unit 113, and an actuator control unit 114.

The recognition unit 111 recognizes the surrounding situation of the subject vehicle 101 based on the image captured by the camera 4. In the example illustrated in FIG. 3, the recognition unit 111 recognizes the other vehicle 102 traveling in the adjacent lane LN3 on one side of the current lane LN2 and the other vehicle 103 traveling in the adjacent lane LN1 on the other side of the current lane.

The generation unit 112 generates a target path for the subject vehicle 101 (the driving path of the subject vehicle 101 from the present time to a predetermined time ahead) according to the surrounding situation recognized by the recognition unit.

The actuator control unit 114 controls the actuators AC to execute offset control (offset shift control, offset continuation control, and offset return control described below) in which the subject vehicle 101 travels away from the other vehicle 102 in the vehicle width direction when the subject vehicle 101 and the other vehicle 102 are closer than a specified degree in the traveling direction. The predetermined degree refers to the degree of proximity between the subject vehicle 101 and the other vehicle 102 to the extent that causes anxiety or a feeling of pressure to the occupant of the subject vehicle 101.

More specifically, the actuator control unit 114 controls the actuators AC to execute an offset shift control in which the subject vehicle 101 shifts laterally (shift in the vehicle width direction) at an acceleration (acceleration in the vehicle width direction) that the occupant does not notice when the distance from the subject vehicle 101 to the other vehicle 102 recognized by the recognition unit 111 becomes less than the offset start distance SD. The offset start distance SD is determined based on the time it takes for the subject vehicle 101 and the other vehicle 102 to run side-by-side (in the example illustrated in FIG. 3, the time until the head of subject vehicle 101 and the tail of the other vehicle 102 are aligned), which is determined based on the traveling position and relative speed of the subject vehicle 101 and the other vehicle 102. The actuator control unit 114 controls the actuators AC to stop the offset shift control when the distance in the vehicle width direction between the subject vehicle 101 and the other vehicle 102 recognized by the recognition unit 111 is equal to or more than a predetermined length, and to execute the offset continuation control in which the subject vehicle 101 maintains its traveling position (position in the vehicle width direction). When the recognition unit 111 recognizes that the subject vehicle 101 has passed by the side of the other vehicle 102, the actuator control unit 114 controls the actuators AC to execute the offset return control in which the subject vehicle 101 shifts laterally so that the traveling position (position in the vehicle width direction) returns to the position before the offset. Hereafter, the driving path of the subject vehicle 101 when the subject vehicle 101 is shifting to offset pdriving by the offset shift control, that is, when the subject vehicle 101 is moving away from the other vehicle 102 in the vehicle width direction, is called the offset start path. The driving path of the subject vehicle 101 when the offset driving is continued by the offset continuation control is called the offset continuation path. Furthermore, the driving path of the subject vehicle 101 when the subject vehicle 101 is returning from offset driving is referred to as an offset return path.

Figure 4A:
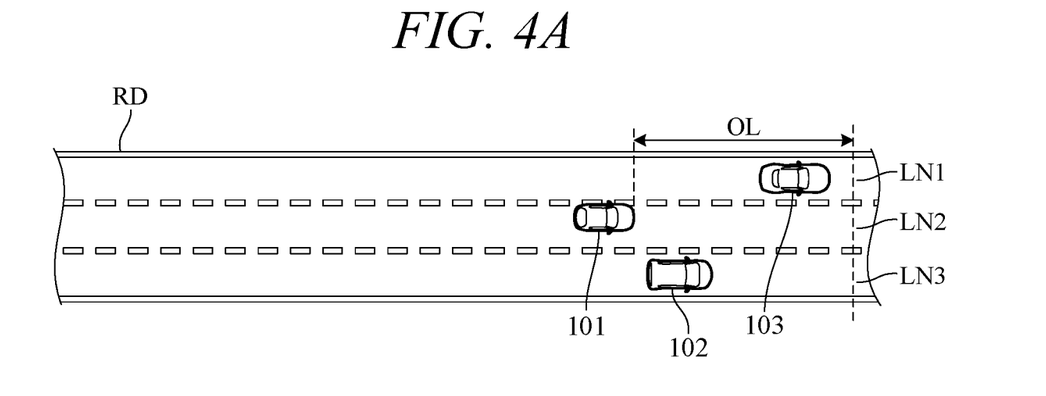
FIG. 4A is a diagram showing an example of a traveling scene at a predetermined time after the point in FIG. 3.

When the other vehicle 102 traveling in the adjacent lane LN3 and the other vehicle 103 traveling in the adjacent lane LN1 are recognized by the recognition unit 111, the determination unit 113 determines whether the other vehicle 103 is located within a predetermined range (range OL in FIG. 4A below) from the subject vehicle 101 when the subject vehicle 101 and the other vehicle 102 are closer than a predetermined degree in the traveling direction. This determination is made before the distance from the subject vehicle 101 to the other vehicle 102 becomes less than the offset start distance SD. This determination is made based on the traveling position of the other vehicle 102 and the relative speed of the other vehicle 102 relative to the subject vehicle 101, and the traveling position of the other vehicle 103 and the relative speed of the other vehicle 103 relative to the subject vehicle 101. Hereinafter, when the subject vehicle 101 and the other vehicle 102 are closer than a predetermined degree in the traveling direction, the fact that the other vehicle 103 is located within a predetermined range OL from the subject vehicle 101 may be expressed as that the subject vehicle 101 overlaps with the other vehicles 102 and 103. FIG. 4A illustrates an example of a traveling scene at a predetermined time after the point in FIG. 3. FIG. 4A illustrates a situation where the subject vehicle 101 and the other vehicle 102 are closer than a predetermined degree in the traveling direction and the subject vehicle 101 overlaps the other vehicles 102 and 103. In the example illustrated in FIG. 4A, the offset control to avoid the other vehicle 102 has already been started by the actuator control unit 114, and the traveling position of the subject vehicle 101 is offset in the direction away from the other vehicle 102 (toward the adjacent lane LN1). At this time, if the offset control to avoid the other vehicle 103 is started by the actuator control unit 114, the driving path of the subject vehicle 101 may become a path that makes the subject vehicle 101 wobble as illustrated in FIG. 1B, which may cause anxiety or discomfort to the occupant as described above. That is, if offset control to avoid the other vehicle 102 is executed in a situation where the subject vehicle 101 may overlap with the other vehicles 102 and 103, the offset control to avoid the other vehicle 103 will be executed immediately thereafter, which may cause the subject vehicle 101 to wobble and cause anxiety or discomfort to the occupant.

Therefore, the determination unit 113 determines whether or not the subject vehicle 101 overlaps with the other vehicles 102 and 103 when the subject vehicle 101 and the other vehicle 102 are closer than a predetermined degree in the traveling direction before the distance from the subject vehicle 101 to the other vehicle 102 becomes less than the offset start distance SD. When the determination unit 113 determines that the subject vehicle 101 overlaps with the other vehicles 102 and 103, the actuator control unit 114 controls the actuators AC so that the distance from the subject vehicle 101 to the other vehicle 102 does not become less than the offset start distance SD, that is, so that the offset control to avoid the other vehicle 102 is not executed, and the deceleration control to slow the subject vehicle 101 is executed. At this time, the actuator control unit 114 executes deceleration control so that the subject vehicle 101 decelerates at a deceleration level that the occupant does not notice (hereinafter referred to as slow deceleration control). The deceleration level that the occupant does not notice is the deceleration level such that the magnitude of the amount of change per unit time in the traveling speed of the subject vehicle 101 is equal to or less than a predetermined value; for example, the deceleration level is such that the brake lights (not illustrated) at the rear of the subject vehicle 101 do not light up. The predetermined value is determined in advance based on the results of sensory evaluation and others. The brake lamp is configured to be turned off when an operation amount of a brake petal (not illustrated) operated by the occupant is equal to or less than a predetermined amount and to be turned on when the operation amount is greater than the predetermined amount while the subject vehicle 101 is traveling in the manual driving mode. The brake lamps are configured to turn off when the amount of braking included in the braking command from the ECU for the braking device is equal to or less than a predetermined amount and to turn on when the amount of braking is greater than the predetermined amount when the subject vehicle 101 is in the self-drive mode. The predetermined amount is determined based on the above predetermined value.

Figure 4B:
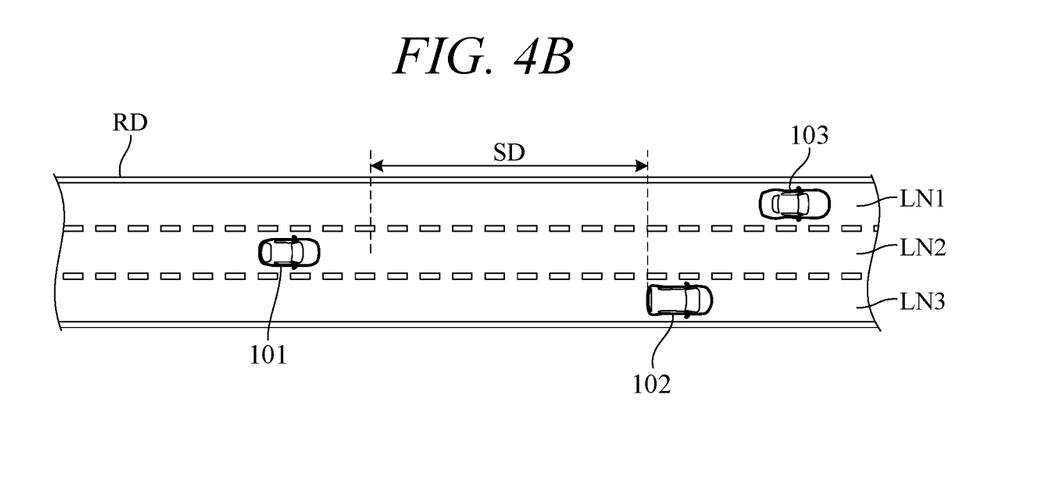
FIG. 4B is a diagram showing another example of a traveling scene at a predetermined time after the point in FIG. 3.

FIG. 4B illustrates another example of a traveling scene at a predetermined time after the point in FIG. 3. FIG. 4B illustrates a state in which the subject vehicle 101 decelerates by slow deceleration control by the actuator control unit 114 in the traveling scene of FIG. 3. The slow deceleration control by the actuator control unit 114 maintains the state where the distance from the subject vehicle 101 to the other vehicle 102 is greater than the offset start distance SD, as illustrated in FIG. 4B, and the execution of the offset control is prevented. Thus, when there is a possibility that the subject vehicle 101 may overlap with other vehicles 102 and 103 when the subject vehicle 101 and the other vehicle 102 are closer than a predetermined degree in the traveling direction, the driving operation of the subject vehicle 101 is controlled so that the distance from the subject vehicle 101 to the other vehicle 102 is not less than the offset start distance SD. This prevents the generation of a driving path that causes the subject vehicle 101 to wobble, as illustrated in FIG. 1B. The length of the predetermined range OL in the traveling direction is determined based on the length of the offset continuation path in a case where the subject vehicle 101 were to execute offset driving to avoid the other vehicle 102. More specifically, the length of the predetermined range OL in the traveling direction is determined based on the length of the offset continuation path and the relative speed of the subject vehicle 101 with respect to the other vehicle 102, so that the traveling position of the other vehicle 103 is not included within the range of the offset continuation path. The length of the predetermined range OL in the traveling direction may be determined in conjunction with the offset start distance SD. When the relative speed of the subject vehicle 101 to the other vehicle 102 is small, the subject vehicle 101 can complete the offset driving to avoid the other vehicle 102 without interference with the other vehicle 103, even if the offset start distance SD is short. Therefore, the offset start distance SD is determined so that the smaller the relative speed of the subject vehicle 101 relative to the other vehicle 102, the shorter the offset start distance SD. When the offset start distance SD is determined to be shorter in accordance with the relative speed of the subject vehicle 101 relative to the other vehicle 102, the length of the predetermined range OL in the traveling direction may also be determined to be shorter in conjunction with the offset start distance SD. The length of the predetermined range OL in the traveling direction may be determined by a method other than the above.

Figure 5:
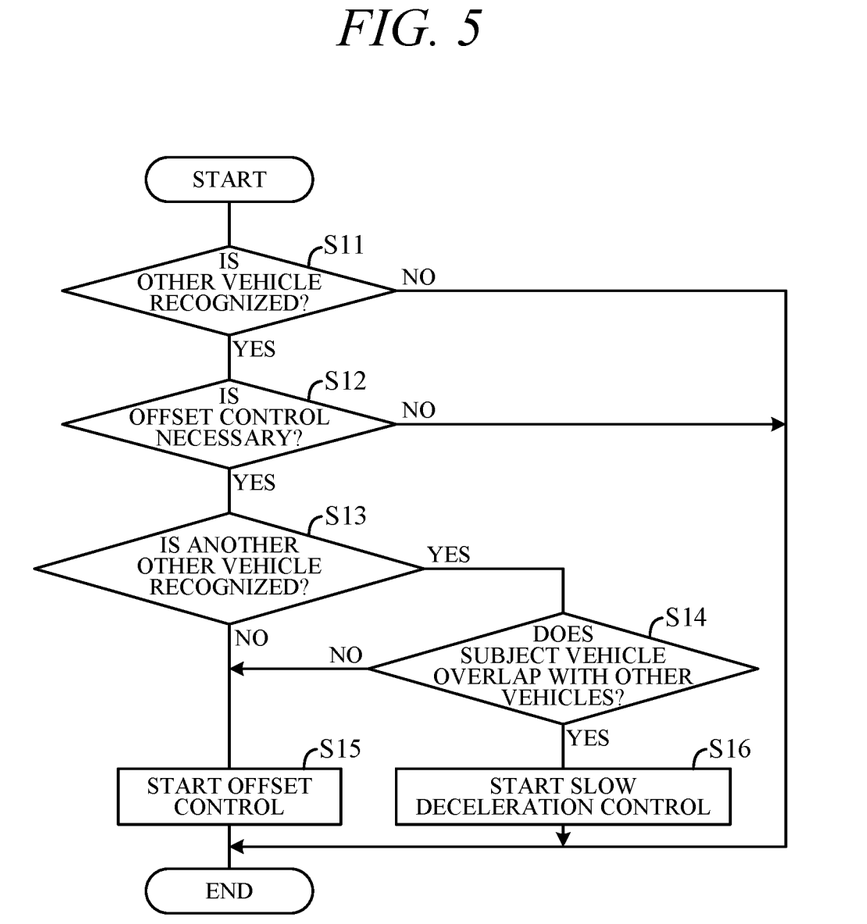
FIG. 5 is a flowchart illustrating an example of processing executed by the CPU of the controller in FIG. 2.

FIG. 5 is a flowchart illustrating an example of processing executed by the CPU of the controller 10 in FIG. 2 according to a pre-stored program. The processing in the flowchart is, for example, executed at a predetermined cycle while the subject vehicle 101 is traveling in the self-drive mode. Here, the case where the subject vehicle 101 is traveling in the center lane LN2 of the road RD with three lanes on each side illustrated in FIG. 3 is used as an example.

First, in step S11, it is determined whether or not the other vehicle (first other vehicle) traveling in the adjacent lane in front of the subject vehicle 101 is recognized based on the image captured by the camera 4. If NO in step S11, the processing ends. If YES in step S11, in step S12, it is determined whether offset control is necessary to avoid the first other vehicle recognized in step S11. Specifically, based on the relative speed of the subject vehicle 101 to the first other vehicle, it is predicted whether or not a passing run will occur in which the subject vehicle 101 passes by the side of the first other vehicle, and when it is predicted that there will be a passing run, it is determined that offset control to avoid the first other vehicle is necessary. If NO in step S12, the processing ends. If YES in step S12, in step S13, it is determined whether another other vehicle (second other vehicle) traveling in the adjacent lane opposite to the adjacent lane in which the first other vehicle is traveling is recognized. If NO in step S13, offset control is started in step S15. As a result, the subject vehicle 101 passes by the side of the first other vehicle while traveling away from the first other vehicle in the vehicle width direction.

On the other hand, If YES in step S13, in step S14, it is determined whether or not the second other vehicle is located within a predetermined range OL from the subject vehicle 101 when the subject vehicle 101 and the first other vehicle are closer than a predetermined degree in the traveling direction. That is, it is determined that whether or not the subject vehicle 101 overlaps with the first and second other vehicles. If NO in step S14, the processing proceeds to step S15. On the other hand, if YES in step S14, in step S16, slow deceleration control is started so that the subject vehicle 101 does not approach the first other vehicle by more than the predetermined degree, that is, the distance to the first other vehicle is not less than the offset start distance SD.

Figure 6A:
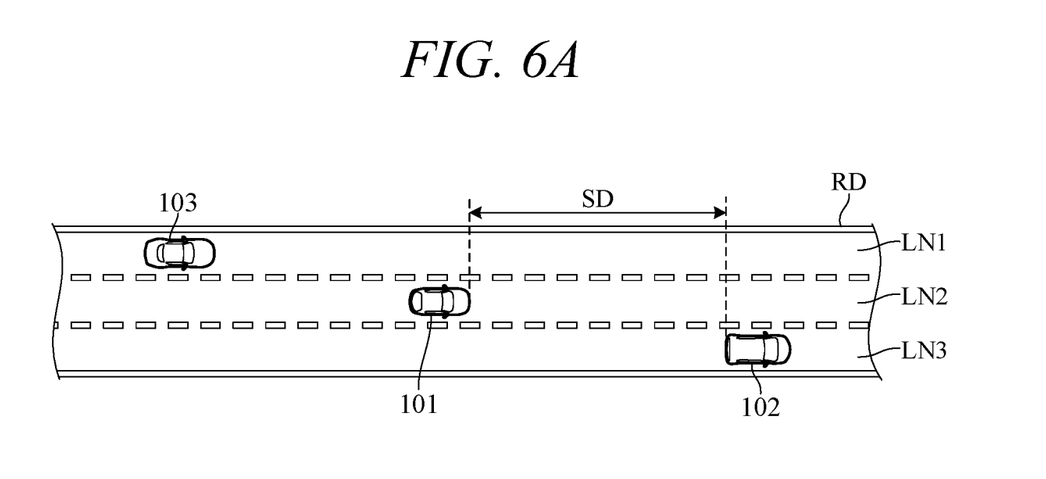
FIG. 6A is a diagram showing another example of a traveling scene of a vehicle to which the traveling control device of the present embodiment is applied.
Figure 6B:
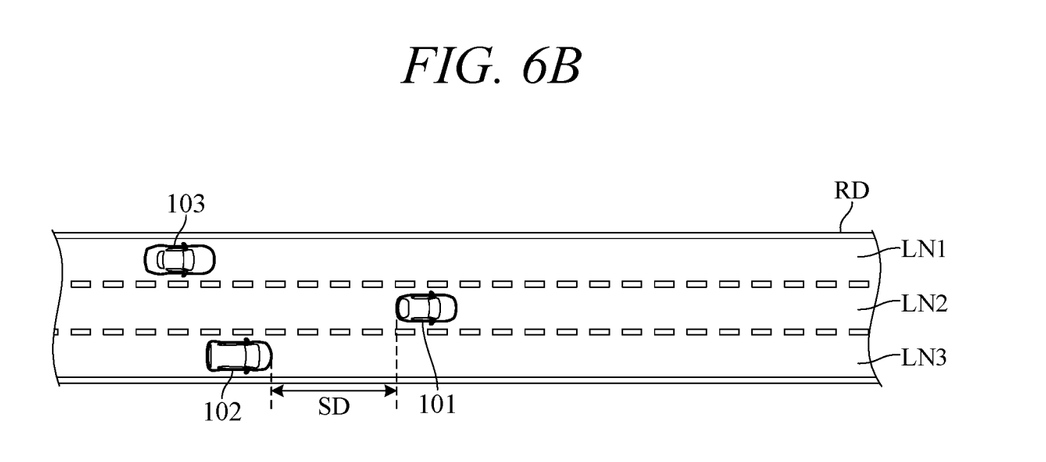
FIG. 6B is a diagram showing another example of a traveling scene of a vehicle to which the traveling control device of the present embodiment is applied.

The processing of FIG. 5 is described here using a traveling scene in which the other vehicle is recognized in front of the subject vehicle 101 as an example. Alternatively, the processing of FIG. 5 may also be applied to traveling scenes in which other vehicles are recognized behind the subject vehicle 101. These traveling scenes are described below with reference to FIGS. 6A and 6B. FIGS. 6A and 6B illustrate another example of the traveling scene of the subject vehicle 101 to which the traveling control device 100 of the present embodiment is applied.

FIG. 6A illustrates an example of a traveling scene in which the other vehicle 102 traveling in the adjacent lane LN3 is recognized in front of the subject vehicle 101 traveling in the lane LN2 of the road RD, and the other vehicle 103 traveling in the adjacent lane LN1 is recognized behind the subject vehicle 101. In the traveling scene of FIG. 6A, when the traveling speed V1 of the subject vehicle 101 is greater than the traveling speed V2 of the other vehicle 102 and the traveling speed V3 of the other vehicle 103 is greater than the traveling speeds V1 and V2, the subject vehicle 101 may overlap with the other vehicles 102 and 103. Also, when the other vehicle passes by the side of the subject vehicle 101 from behind, offset control for the subject vehicle 101 to avoid the other vehicle is executed. Therefore, after the offset control to avoid the other vehicle 102 is started, the offset control to avoid the other vehicle 103 may be started subsequently, which may cause the subject vehicle 101 to wobble. Therefore, also when the other vehicle 103 is recognized behind the subject vehicle 101 as illustrated in FIG. 6A (S13), it is determined whether the subject vehicle 101 overlaps with the other vehicles 102 and 103 (S14), and in a case where it is determined that it overlaps, slow deceleration control is executed (S16).

FIG. 6B illustrates an example of a traveling scene in which the other vehicle 102 traveling in the adjacent lane LN3 and the other vehicle 103 traveling in the adjacent lane LN1 are both recognized behind the subject vehicle 101. In the traveling scene in FIG. 6B, when the traveling speed V2 of the other vehicle 102 is greater than the traveling speed V1 of the subject vehicle 101 and the traveling speed V3 of the other vehicle 103 is greater than the traveling speeds V1 and V2, the subject vehicle 101 may overlap with the other vehicles 102 and 103. Therefore, also in the traveling scene in FIG. 6B, after the offset control to avoid the other vehicle 102 is started, the offset control to avoid the other vehicle 103 may be started continuously, and the subject vehicle 101 may wander. Therefore, even when the other vehicles 102 and 103 are recognized behind the subject vehicle 101 as illustrated in FIG. 6B (S11, S12, and S13), it is determined whether the subject vehicle 101 overlaps with the other vehicles 102 and 103 (S14), and in a case where it is determined that it does not overlap, offset control is started (S15). If the subject vehicle 101 is slowed down when the other vehicle with a higher traveling speed than the subject vehicle 101 approaches from behind the subject vehicle 101, the relative speed between the subject vehicle 101 and the other vehicle increases, which may increase anxiety to the occupant when the other vehicle passes by the side of the subject vehicle 101. Therefore, when the vehicle recognized in step S11 is a following vehicle, even in a case where it is determined in step S14 that both vehicles overlap, step S16 is skipped and slow deceleration control is not executed.

Figure 7A:
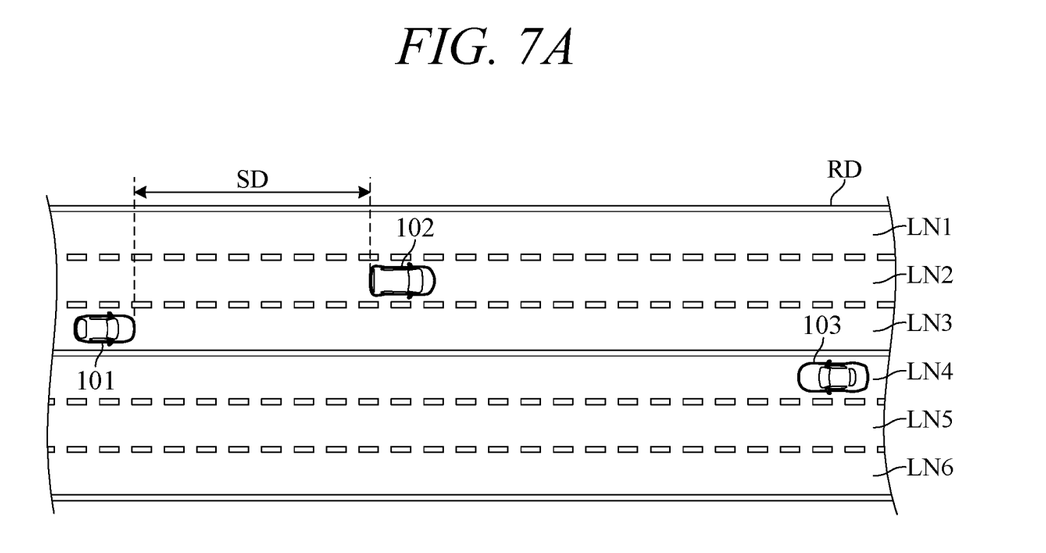
FIG. 7A is a diagram showing another example of a traveling scene of a vehicle to which the traveling control device of the present embodiment is applied.

By the way, as illustrated in FIG. 7A, when the other vehicle 102 traveling in the adjacent lane L2 at the traveling speed V2 (<V1) is recognized in front of the subject vehicle 101 while the subject vehicle 101 is traveling in the lane LN3 of the road RD at the traveling speed V1, the actuator control unit 114 executes offset control for avoiding the other vehicle 102. At this time, the driving path of the subject vehicle 101 is offset in the direction away from the other vehicle 102, that is, toward the opposite lane LN4. Therefore, when there is no median strip between the lanes LN3 and LN4 as illustrated in FIG. 7A, the subject vehicle 101 may approach the other vehicle 103, which is traveling in the lane LN4, in the vehicle width direction. Therefore, even in the traveling scene as illustrated in FIG. 7A, it is determined whether or not the subject vehicle 101 overlaps with the other vehicles 102 and 103 (S14), and when it is determined that the subject vehicle overlaps, slow deceleration control may be executed (S16), and offset control may not be executed.

Figure 7B:
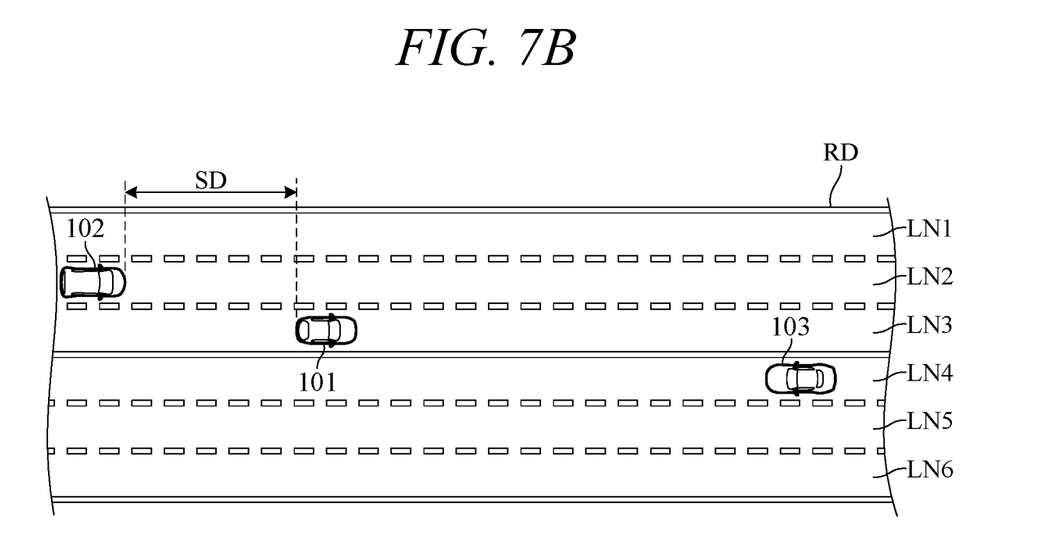
FIG. 7B is a diagram showing another example of a traveling scene of a vehicle to which the traveling control device of the present embodiment is applied.

As illustrated in FIG. 7B, when the other vehicle 102 traveling in the adjacent lane L2 at the traveling speed V2 (>V1) is recognized behind the subject vehicle 101 while the subject vehicle 101 is traveling in the lane LN3 of the road RD at the traveling speed V1, it is similarly determined whether the subject vehicle 101 overlaps with the other vehicles 102 and 103 (S14), and when it is determined that there is no overlap, offset control is started (S15). As in the case of FIG. 6B, decelerating the subject vehicle 101 in FIG. 7B may increase anxiety to the occupant when the other vehicle 102 approaching from behind passes by the side of the subject vehicle 101. Therefore, also in the case of FIG. 7B, step S16 is skipped so that slow deceleration control is not executed.

According to the embodiment of the present invention, the following effects can be achieved.

(1) A traveling control device 100 includes: a recognition unit 111 that recognizes the surrounding situation of a subject vehicle 101; an actuator control unit 114 that controls actuators AC to execute offset control in which the subject vehicle 101 travels away from the other vehicle 102 in the vehicle width direction when the distance in the traveling direction from the subject vehicle 101 to the other vehicle 102 traveling in the same direction as the subject vehicle 101 in the adjacent lane LN3 becomes less than a predetermined distance (offset start distance SD); and a determination unit 113 that determines whether or not the other vehicle 103 is located within a predetermined range OL from the subject vehicle 101 when the subject vehicle 101 and the other vehicle 102 are closer than a predetermined degree in the traveling direction, when the recognition unit 111 recognizes the other vehicle 102 traveling in the adjacent lane LN3 on one side of its current lane LN2, which has the same traveling direction, and the other vehicle 103 traveling in the adjacent lane LN1 on the other side of the current lane LN2. When the determination unit 113 determines that the other vehicle 103 is located within the predetermined range OL from the subject vehicle 101 when the subject vehicle 101 and the other vehicle 102 are closer than a predetermined degree in the traveling direction, the actuator control unit 114 controls the actuator so that the subject vehicle 101 and the other vehicle 102 are not closer than a predetermined degree in the traveling direction. As a specific example, when the other vehicle 102 is recognized by the recognition unit 111 in front of the subject vehicle 101 and the other vehicle 103 is determined to be located within a predetermined range OL from the subject vehicle 101 by the determination unit 113 when the subject vehicle 101 and the other vehicle 102 are closer than a predetermined degree in the traveling direction, the actuator control unit 114 executes deceleration control so that the distance in the traveling direction from the subject vehicle 101 to the other vehicle 102 is not less than a predetermined distance. This suppresses inadvertent offset control, thereby improving ride comfort of the occupant. It can also improve traffic safety because it can appropriately avoid approaching other vehicles traveling in adjacent lanes.

(2) When executing deceleration control, the actuator control unit 114 controls the actuators AC so that the magnitude of the amount of change per unit time in the traveling speed of the subject vehicle 101 is equal to or less than a predetermined value. This allows the subject vehicle 101 to decelerate without causing anxiety or discomfort to the occupant when executing deceleration control.

The above embodiment can be changed to various forms. Hereinafter, modifications will be described. In the above embodiment, the camera 4 is used to capture images of the surroundings of the subject vehicle 101, but any configuration of in-vehicle detection unit may be used as long as it detects the surrounding situation of the subject vehicle 101. For example, the in-vehicle detection unit may be a radar or LiDAR. In the above embodiment, the surrounding situation of the subject vehicle 101 is recognized based on the captured images obtained by the camera 4, but the configuration of the recognition unit is not limited to those described above. The recognition unit may recognize the surrounding situation of the subject vehicle 101 based on information obtained through road-to-vehicle and vehicle-to-vehicle communications via the communication unit 1.

In the above embodiment, the actuator control unit 114 controls the actuators AC to execute slow deceleration control when the determination unit 113 determines that the other vehicle 103 is located within the predetermined range OL from the subject vehicle 101 when the subject vehicle 101 and the other vehicle 102 are closer than a predetermined degree in the traveling direction. However, the actuator control unit may execute acceleration control as well as deceleration control. That is, acceleration/deceleration control may be executed. More specifically, when the other vehicle 102 is recognized behind the subject vehicle 101, the actuator control unit may execute acceleration control to accelerate the subject vehicle 101 at an acceleration that the occupant does not notice so that the distance from the subject vehicle 101 to the other vehicle 102 is not less than the offset start distance SD, specifically, at an acceleration such that the magnitude of the amount of change per unit time of the traveling speed of the subject vehicle 101 is equal to or less than a predetermined value. The actuator control unit may also execute a constant speed traveling that keeps the traveling speed of the subject vehicle 101 constant. The predetermined value used for acceleration control is determined in advance based on the results of sensory evaluation and others.

In the above embodiment, the case where the predetermined range OL is a range having a predetermined length from the front end of the subject vehicle 101 to the front is used as an example. Alternatively, the predetermined range may be a range having a predetermined length from the rear end of the subject vehicle 101 to the rear, or a range having a predetermined length in the front-rear direction centered on the subject vehicle 101.

In the above embodiment, when the subject vehicle 101 may overlap with the other vehicles 102 and 103, the actuator control unit 114 controls the driving operation of the subject vehicle 101 so that the distance from the subject vehicle 101 to the other vehicle 102 is not less than the offset start distance SD. However, the actuator control unit may control the traveling operation of the subject vehicle 101 so that the relative speed of the subject vehicle 101 to the other vehicle 102 is equal to or less than a predetermined threshold (a sufficient difference in traveling speed that does not cause anxiety to the occupant when the subject vehicle 101 passes by the side of the other vehicle 102). For example, when the other vehicle 102 is stopped for some reason, if the traveling operation of the subject vehicle 101 is controlled so that the distance from the subject vehicle 101 to the other vehicle 102 is not less than the offset start distance SD, the subject vehicle 101 may stop before the offset start distance SD from the other vehicle 102 and may be unable to pass by the side of the other vehicle 102. Therefore, in such a case, the traveling operation of the subject vehicle 101 may be controlled so that the subject vehicle 101 passes by the side of the other vehicle 102 with a relative speed to the other vehicle 102 equal to or less than a predetermined threshold value. Furthermore, even if it is determined that the subject vehicle 101 may overlap with the other vehicles 102 and 103, when the relative speed of the subject vehicle 101 to the other vehicle 102 is recognized by the recognition unit 111 to be equal to or more than a predetermined speed, the actuator control unit may execute offset control without deceleration control.

The above embodiment can be combined as desired with one or more of the above modifications. The modifications can also be combined with one another.

According to the present invention, it is possible to suppress inadvertent correction of the driving path that reduces the ride comfort of the occupant.

Above, while the present invention has been described with reference to the preferred embodiments thereof, it will be understood, by those skilled in the art, that various changes and modifications may be made thereto without departing from the scope of the appended claims.

What is claimed is:

1. A traveling control apparatus comprising:
a microprocessor; and
a memory coupled to the microprocessor, wherein the microprocessor is configured to perform:
recognizing a surrounding situation of a subject vehicle;
controlling a traveling actuator, including at least one of throttle actuator, traveling motor, brake actuator or steering actuator, to execute offset control in which the subject vehicle travels away from other vehicle in a vehicle width direction when a distance in a traveling direction from the subject vehicle to the other vehicle traveling in a same direction as the subject vehicle in an adjacent lane adjacent to a current lane in which the subject vehicle is traveling becomes less than a predetermined distance; and
when a first other vehicle traveling in a first adjacent lane adjacent to the current lane on one side of the current lane, which has a same traveling direction as the current lane, and a second other vehicle traveling in a second adjacent lane adjacent to the current lane on another side of the current lane are recognized in the recognizing, determining whether the second other vehicle is located within a predetermined range from the subject vehicle when the subject vehicle and the first other vehicle are closer than a predetermined degree in the traveling direction;
wherein the microprocessor is configured to perform
the controlling including, when it is determined in the determining that the second other vehicle is located within the predetermined range from the subject vehicle when the subject vehicle and the first other vehicle are closer than the predetermined degree in the traveling direction, controlling the traveling actuator so that the distance in the traveling direction from the subject vehicle to the first other vehicle becomes not less than the predetermined distance.

2. The traveling control apparatus according to claim 1, wherein the microprocessor is configured to perform
the controlling including, when it is determined in the determining that the second other vehicle is located within the predetermined range from the subject vehicle when the subject vehicle and the first other vehicle are closer than the predetermined degree in the traveling direction, controlling the traveling actuator to perform an acceleration or deceleration control to accelerate or decelerate the subject vehicle so that the distance in the traveling direction from the subject vehicle to the first other vehicle
becomes not less than the predetermined distance.

3. The traveling control apparatus according to claim 2, wherein the acceleration/deceleration acceleration or deceleration control includes a deceleration control to decelerate the subject vehicle so that the subject vehicle and the first other vehicle are not closer than the predetermined degree in the traveling direction, and
the microprocessor is configured to perform
the controlling including, when the first other vehicle is recognized in front of the subject vehicle in the recognizing and it is determined in the determining that the second other vehicle is located within the predetermined range from the subject vehicle when the subject vehicle and the first other vehicle are closer than the predetermined degree in the traveling direction, controlling the traveling actuator to perform the deceleration control.

4. The traveling control apparatus according to claim 3, wherein
the microprocessor is configured to perform
the controlling including, when the first other vehicle is recognized behind the subject vehicle in the recognizing and it is determined in the determining that the second other vehicle is located within the predetermined range from the subject vehicle when the subject vehicle and the first other vehicle are closer than the predetermined degree in the traveling direction, controlling the traveling actuator not to perform the deceleration control.

5. The traveling control apparatus according to claim 3, wherein the acceleration or deceleration control includes an acceleration control to accelerate the subject vehicle so that the subject vehicle and the first other vehicle are not closer than the predetermined degree in the traveling direction, and
the microprocessor is configured to perform the controlling including, when the first other vehicle is recognized behind the subject vehicle in the recognizing and it is determined in the determining that the second other vehicle is located within the predetermined range from the subject vehicle when the subject vehicle and the first other vehicle are closer than the predetermined degree in the traveling direction, controlling the traveling actuator to perform the acceleration control.

6. The traveling control apparatus according to claim 5, wherein the microprocessor is configured to perform the controlling including, when performing the acceleration control, controlling the traveling actuator so that a magnitude of an amount of change per unit time in a traveling speed of the subject vehicle is equal to or less than a predetermined value.

7. The traveling control apparatus according to claim 2, wherein the microprocessor is configured to perform the controlling including, when performing the acceleration or deceleration control, controlling the traveling actuator so that a magnitude of an amount of change per unit time in a traveling speed of the subject vehicle is equal to or less than a predetermined value.

8. A traveling control apparatus comprising:
a microprocessor; and
a memory coupled to the microprocessor, wherein
the microprocessor is configured to perform as:
a recognition unit configured to recognize a surrounding situation of a subject vehicle;
an actuator control unit configured to control a traveling actuator, including at least one of throttle actuator, traveling motor, brake actuator or steering actuator, to execute offset control in which the subject vehicle travels away from other vehicle in a vehicle width direction when a distance in a traveling direction from the subject vehicle to the other vehicle traveling in a same direction as the subject vehicle in an adjacent lane adjacent to a current lane in which the subject vehicle is traveling becomes less than a predetermined distance; and
a determination unit configured to, when a first other vehicle traveling in a first adjacent lane adjacent to the current lane on one side of the current lane, which has a same traveling direction as the current lane, and a second other vehicle traveling in a second adjacent lane adjacent to the current lane on another side of the current lane are recognized by the recognition unit, determine whether the second other vehicle is located within a predetermined range from the subject vehicle when the subject vehicle and the first other vehicle are closer than a predetermined degree in the traveling direction, wherein
the actuator control unit, when it is determined by the determination unit that the second other vehicle is located within the predetermined range from the subject vehicle when the subject vehicle and the first other vehicle are closer than the predetermined degree in the traveling direction, controls the traveling actuator so that the distance in the traveling direction from the subject vehicle to the first other vehicle becomes not less than the predetermined distance.

9. The traveling control apparatus according to claim 8, wherein the actuator control unit, when it is determined by the determination unit that the second other vehicle is located within the predetermined range from the subject vehicle when the subject vehicle and the first other vehicle are closer than the predetermined degree in the traveling direction, controls the traveling actuator to perform an acceleration or deceleration control to accelerate or decelerate the subject vehicle so that the distance in the traveling direction from the subject vehicle to the first other vehicle becomes not less than the predetermined distance.

10. The traveling control apparatus according to claim 9, wherein the acceleration or deceleration control includes a deceleration control to decelerate the subject vehicle so that the subject vehicle and the first other vehicle are not closer than the predetermined degree in the traveling direction, and the actuator control unit, when the first other vehicle is recognized in front of the subject vehicle by the recognition unit and it is determined by the determination unit that the second other vehicle is located within the predetermined range from the subject vehicle when the subject vehicle and the first other vehicle are closer than the predetermined degree in the traveling direction, controls the traveling actuator to perform the deceleration control.

11. The traveling control apparatus according to claim 10, wherein the actuator control unit, when the first other vehicle is recognized behind the subject vehicle by the recognition unit and it is determined by the determination unit that the second other vehicle is located within the predetermined range from the subject vehicle when the subject vehicle and the first other vehicle are closer than the predetermined degree in the traveling direction, controls the traveling actuator not to perform the deceleration control.

12. The traveling control apparatus according to claim 10, wherein the acceleration or deceleration control includes an acceleration control to accelerate the subject vehicle so that the subject vehicle and the first other vehicle are not closer than the predetermined degree in the traveling direction, and the actuator control unit, when the first other vehicle is recognized behind the subject vehicle by the recognition unit and it is determined by the determination unit that the second other vehicle is located within the predetermined range from the subject vehicle when the subject vehicle and the first other vehicle are closer than the predetermined degree in the traveling direction, controls the traveling actuator to perform the acceleration control.

13. The traveling control apparatus according to claim 12, wherein the actuator control unit, when performing the acceleration control, controls the traveling actuator so that a magnitude of an amount of change per unit time in a traveling speed of the subject vehicle is equal to or less than a predetermined value.

14. The traveling control apparatus according to claim 9, wherein the actuator control unit, when performing the acceleration or deceleration control, controls the traveling actuator so that a magnitude of an amount of change per unit time in a traveling speed of the subject vehicle is equal to or less than a predetermined value.

* * * * *